(12) United States Patent
Bilski et al.

(10) Patent No.: US 8,815,087 B2
(45) Date of Patent: Aug. 26, 2014

(54) FLUID FILTER

(75) Inventors: Gerard Walter Bilski, Perrysburg, OH (US); Michael Sterling Lynch, Fostoria, OH (US)

(73) Assignee: Fram Group IP, LLC, Lake Forest, IL (US)

( * ) Notice: Subject to any disclaimer, the term of this patent is extended or adjusted under 35 U.S.C. 154(b) by 207 days.

(21) Appl. No.: 13/305,128

(22) Filed: Nov. 28, 2011

(65) Prior Publication Data

US 2013/0134084 A1    May 30, 2013

(51) Int. Cl.
*B01D 35/30* (2006.01)
*B01D 27/08* (2006.01)

(52) U.S. Cl.
CPC ............ *B01D 27/08* (2013.01); *B01D 2201/30* (2013.01)
USPC ........... 210/232; 210/237; 210/238; 210/435; 210/455

(58) Field of Classification Search
None
See application file for complete search history.

(56) References Cited

U.S. PATENT DOCUMENTS

| | | | | |
|---|---|---|---|---|
| 3,224,585 | A * | 12/1965 | Scavuzzo et al. | 210/232 |
| 5,207,131 | A | 5/1993 | Pool et al. | |
| 5,353,666 | A | 10/1994 | Rogers | |
| 5,845,552 | A | 12/1998 | Piascik | |
| 6,217,762 | B1 | 4/2001 | Rooney et al. | |
| 6,877,632 | B2 * | 4/2005 | Gerdes | 220/303 |
| 2005/0056124 | A1 | 3/2005 | Zulauf et al. | |
| 2012/0261323 | A1 * | 10/2012 | Badeau et al. | 210/232 |

* cited by examiner

*Primary Examiner* — Benjamin Kurtz
(74) *Attorney, Agent, or Firm* — Erin J. Fox; Barnes & Thornburg LLP

(57) ABSTRACT

A fluid filter is disclosed herein, the fluid filter having a cylindrical body with a plurality of flutes disposed around its outer circumference, a cap coupled for rotation with the body having a plurality of projections disposed to engage the plurality of flutes, wherein the plurality of projections rotate past the plurality of flutes when a torque exceeding a threshold is applied to the cap.

17 Claims, 6 Drawing Sheets

FLUID FILTER

BACKGROUND OF THE INVENTION

The subject matter disclosed herein relates to a fluid filter and in particular to a fluid filter having an integral mechanism for installing the fluid filter.

Vehicles having internal combustion engines, such as automobiles for example, typically have replaceable filters that remove contaminants from the fluid. For oil lubrication fluids, the oil will be periodically drained and replaced with new oil. The oil lubrication system includes a filter that removes particulates from the oil during operation. Usually, this filter is replaced at the same time the oil is changed since the filtering medium within the filter will gradually become less effective over time as the particulate becomes trapped within the filter.

The removal and installation of an oil filter is usually accomplished either by hand or using a specifically designed tool, sometimes referred to as a filter wrench. Since the lubrication system is under pressure, the oil filter is installed to a particular torque level to ensure a desired seal between the filter and the engine. Typically, the installation requires the operator to turn the filter a predetermined amount, such as ¾ to 1 turn once the filter seal contacts the engine surface. It should be appreciated that under tightening of the oil filter may result in oil leakage and over tightening of the oil filter may result in difficulty in removing the oil filter during the next oil change.

Accordingly, while existing automotive fluid filters are suitable for their intended purposes, the need for improvement remains, particularly in providing a fluid filter that assists the operator in installing the filter with a desired level of sealing.

BRIEF DESCRIPTION OF THE INVENTION

According to one embodiment of the invention, a fluid filter is provided having a body with two ends, a first end having a plurality of flutes disposed about the circumference. A cap attached to the body has a wall defining an interior area within which the body fits. The wall has a plurality of projections disposed about the circumference of the inner diameter of the wall. The plurality of projections are arranged to engage the plurality of flutes when the cap and body are aligned.

According to another embodiment of the invention, a fluid filter is provided having a cylindrical body of which one end has a plurality of flutes disposed about its circumference. A cap having a planar end and a cylindrical wall extending from the planar end is coupled to the body. The cylindrical wall defines an interior portion of the cap sized to receive the end of the cylindrical body. The cylindrical wall has a plurality of projections disposed to engage the plurality of flutes. The plurality of projections is rotates relative to the plurality of flutes when a torque is applied to the cap that exceeds a threshold.

According to yet another embodiment of the invention, a fluid filter is provided having a cylindrical body having an end with a plurality of flutes disposed about its circumference. The plurality of flutes have a first ramp surface disposed at a first angle, a second ramp surface disposed at a second angle, and a flute fillet between the first ramp surface and the second ramp surface. A cap is coupled for rotation to the body. The cap additionally comprises a plurality of projections disposed to engage the plurality of flutes. The plurality of projections rotates past the plurality of flutes when a torque applied to the cap in a first direction exceeds a threshold.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Fluid filters are used in a wide variety of applications, such as internal combustion engines for example, to remove contaminants such as a particulate from a fluid stream. The fluid filters are installed to provide a desired level of sealing between the fluid filter and the corresponding equipment (e.g. the engine). It is desirable to have the fluid filter installed without under tightening, which could result in leakage, or over tightening which could make it difficult to remove the filter after a period of operation. Embodiments of the present invention include a filter body with an integrated cap that rotates relative to the body once a threshold torque has been applied that ensures a desired level of sealing. This is advantageous to the user in that it provides feedback to the installer that sufficient torque has been applied to the filter. In other embodiments, the integrated cap engages the body when a reverse torque is applied to allow the filter to be removed.

Figure 1:
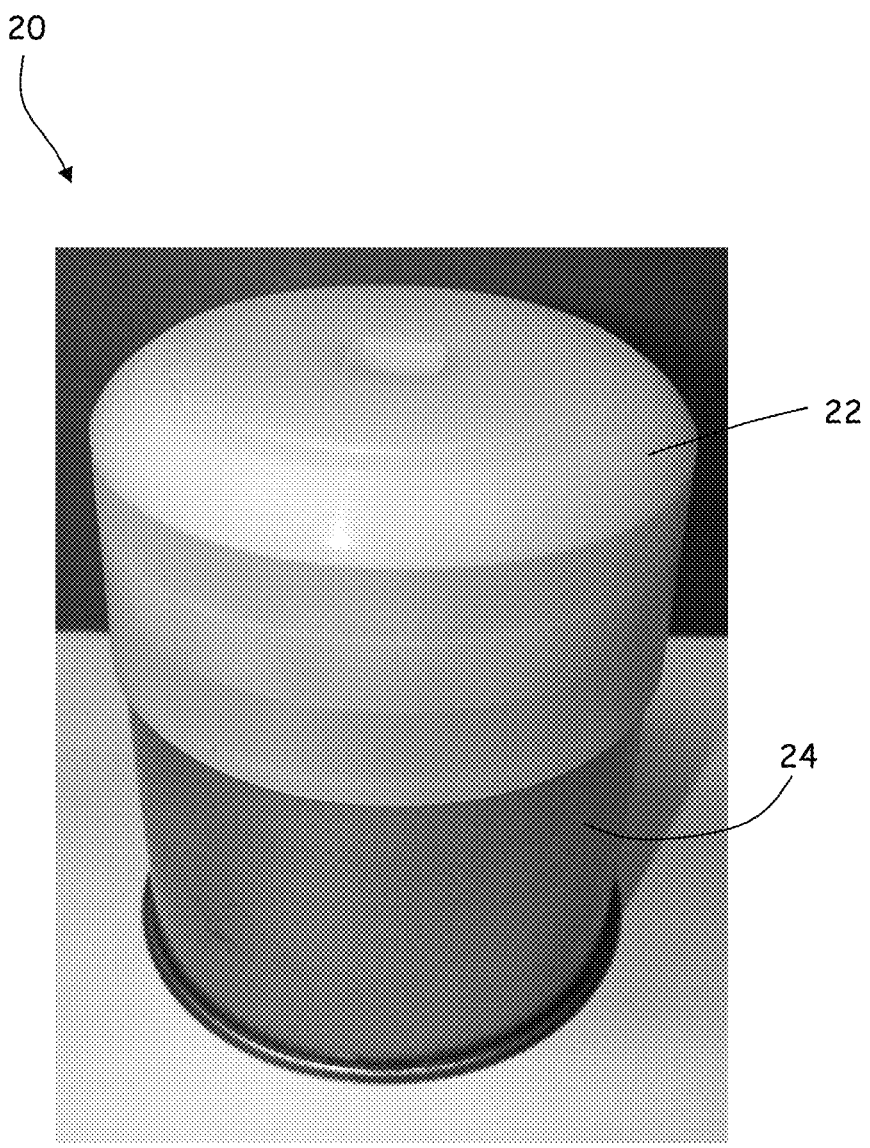
FIG. 1 is a perspective view of a fluid filter in accordance with an embodiment of the invention.
Figure 2:
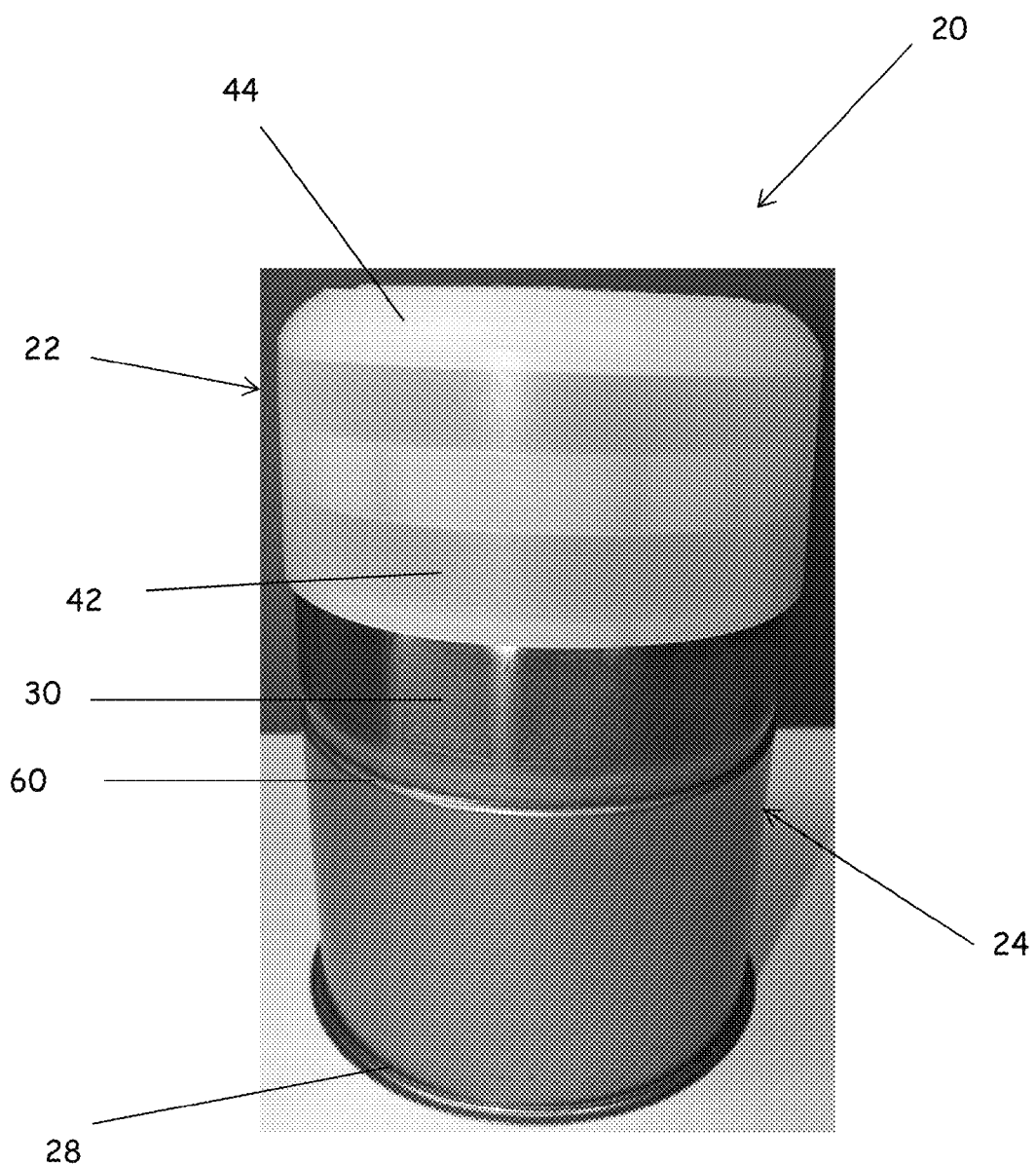
FIG. 2 is a perspective view of the fluid filter of FIG. 1 with a ratcheting member partially removed.
Figure 3:
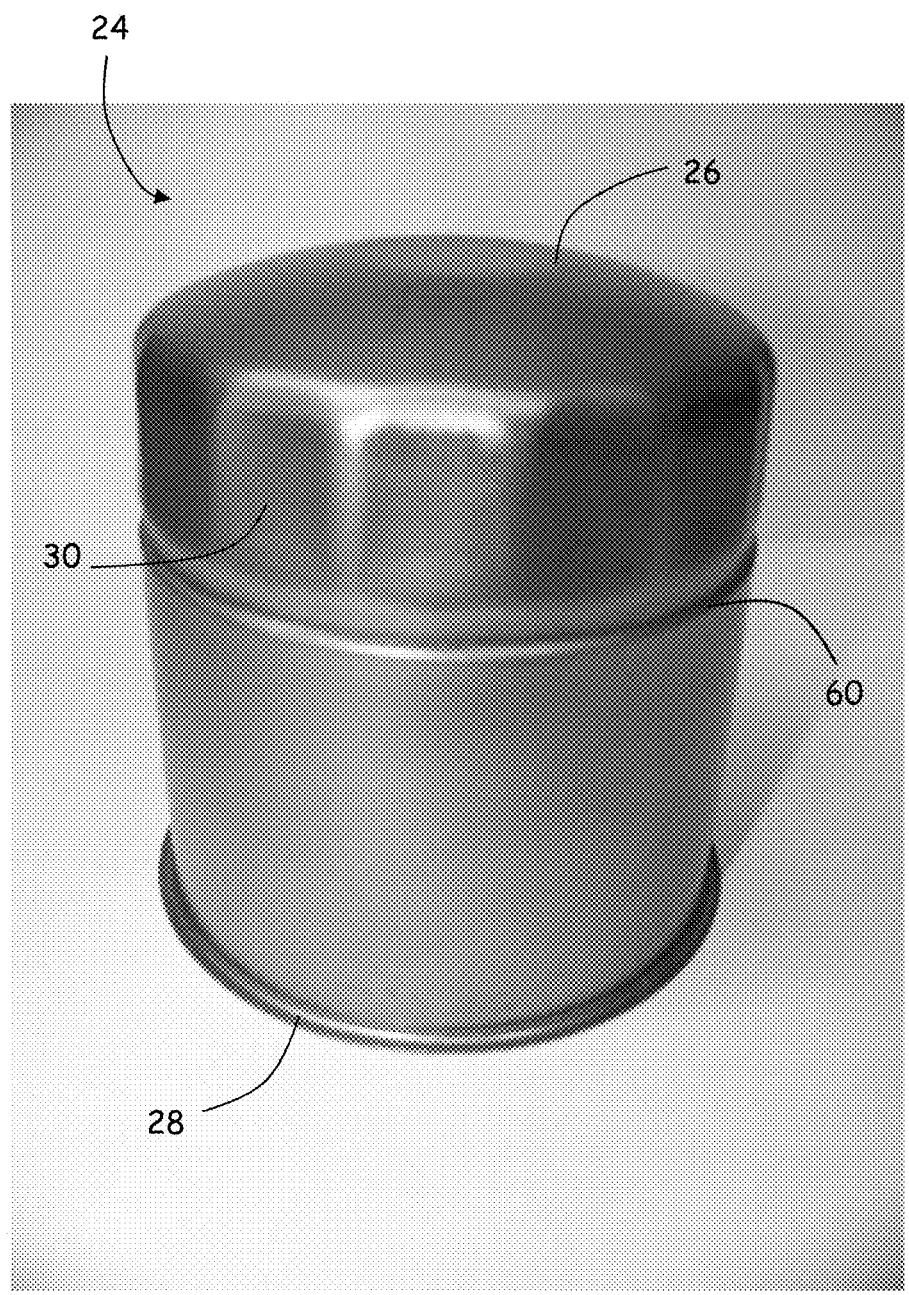
FIG. 3 is a perspective view of a filter body of the fluid filter of FIG. 1.
Figure 4:
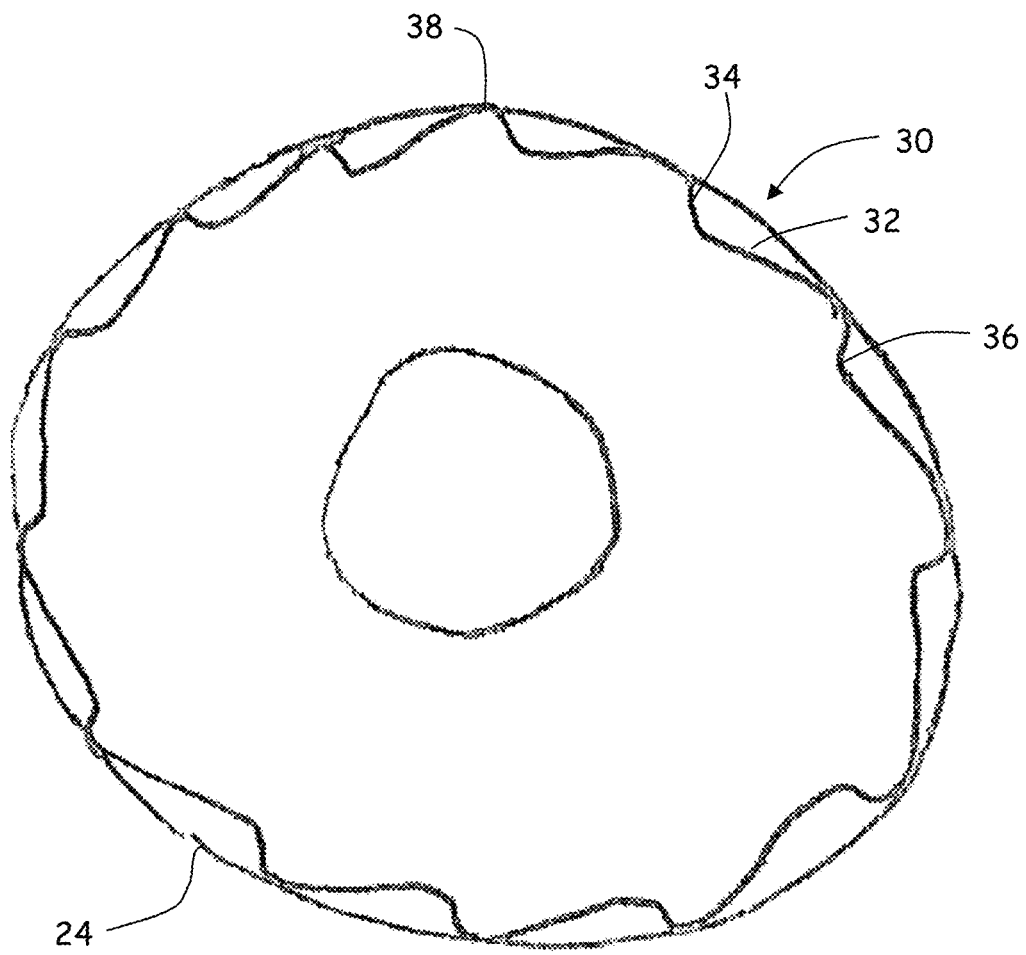
FIG. 4 is a top view of the filter body of FIG. 3.
Figure 5:
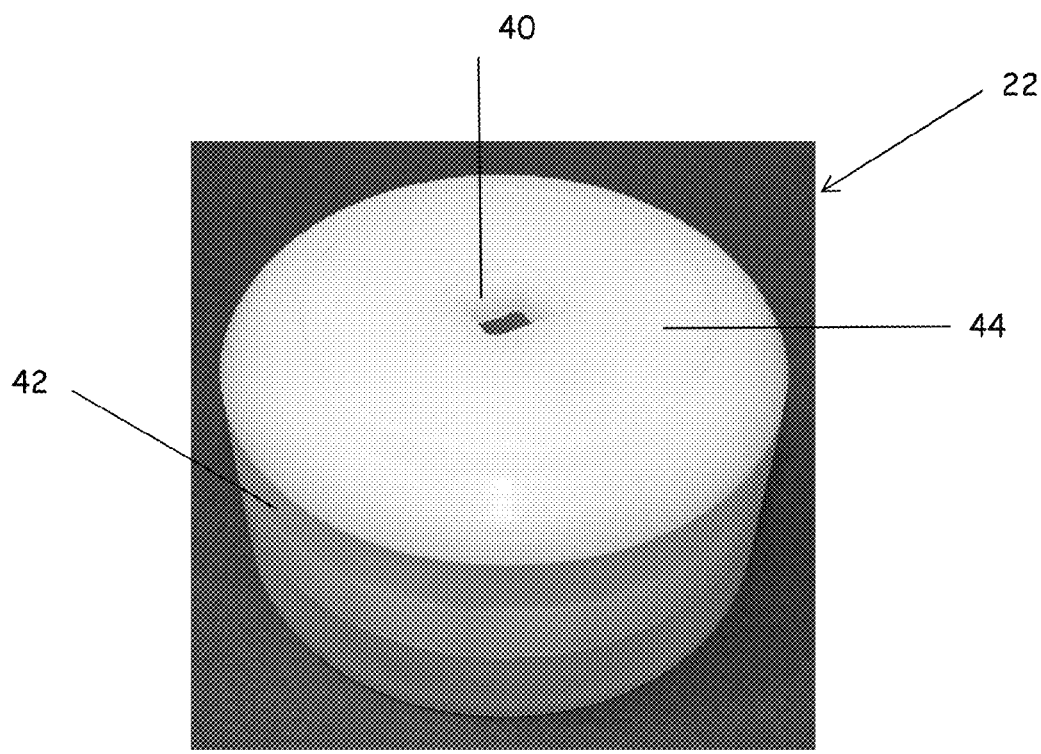
FIG. 5 is a perspective view of a cap member of the fluid filter of FIG. 1.
Figure 6:
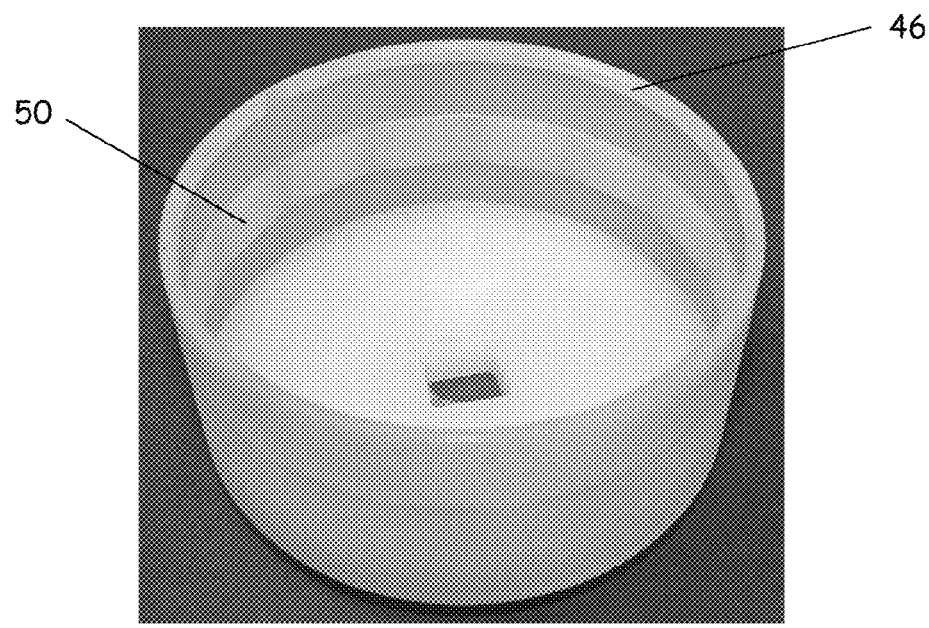
FIG. 6 is a reverse perspective view of the cap member of FIG. 4.
Figure 7:
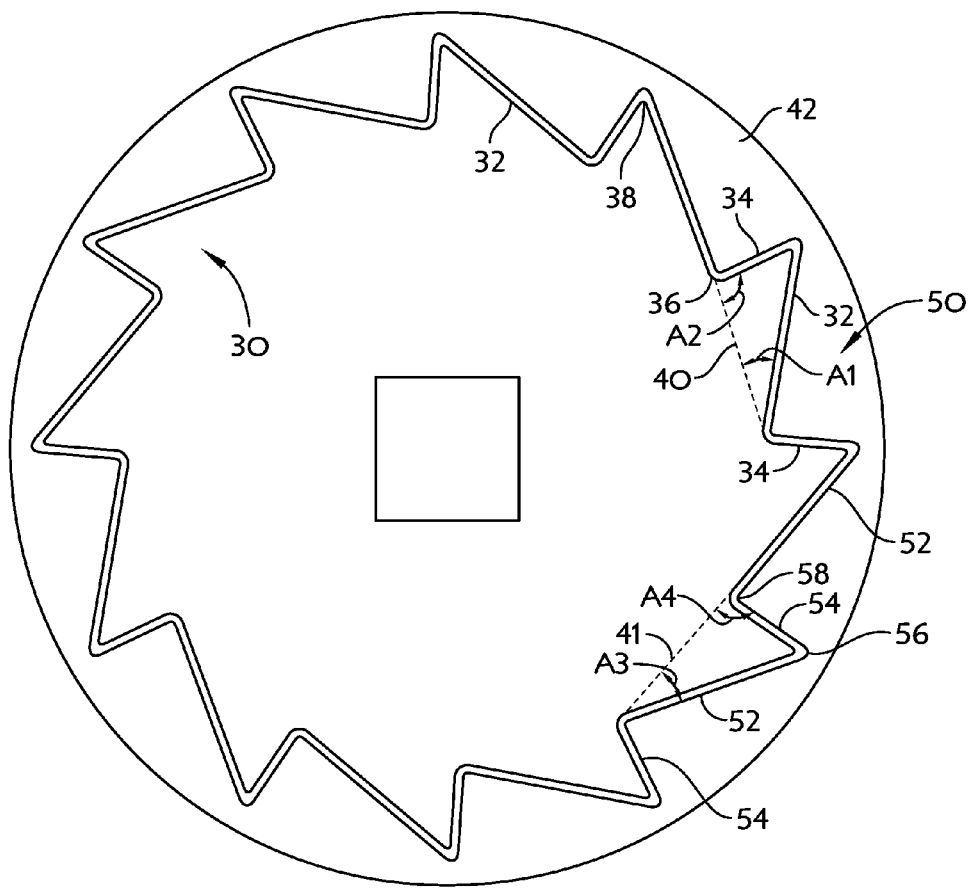
FIG. 7 is a sectional view of the cap and filter body taken through the projections and flutes when arranged as in FIG. 1.

Referring now to FIGS. 1-7, an embodiment is shown of a fluid filter 20 having an integrated cap 22 and a cylindrical body 24. The cap 22 is rotationally coupled to a first end 26 of body 24. The body 24 includes a second end 28 which includes features (not shown) that allow an operating fluid (e.g. engine lubricant) to enter and exit the filter 20. The second end 28 further includes a coupling means (not shown), such as a threaded opening for example, which allows the filter 20 to be coupled to a desired application, such as an internal combustion engine for example. The second end 28 further includes a seal (not shown), such as a gasket for example, that provides a seal that prevents leakage of the operating fluid.

The first end 26 of body 24 is closed to contain the operating fluid during the filtering process. In one embodiment, adjacent first end 26 is a plurality of flutes 30. Positioned on body 24, between the plurality of flutes 30 and the second end 28, is a circumferential groove 60. The plurality of flutes is disposed circumferentially about the body 24. Each flute 30 includes one or more surfaces that engage features on the cap 22 to allow the cap 22 to rotate the filter 20. In the exemplary embodiment, each flute 30 includes a first ramp surface 32, a second ramp surface 34, a curved transition surface or flute fillet 36 connecting bottom ends of the ramped surfaces 32, 34, and a further curved transition surface or flute tip 38 that connects upper ends of the ramped surfaces 32, 34. In the exemplary embodiment, the flute tip 38 does not extend beyond the outer diameter of the body 24. The first ramp surface 32 is disposed at a first angle A1 with respect to a straight line 40 formed between adjacent flute fillets 36 and the second ramp surface 34 is disposed at a second angle A2 with respect to the straight line 40. The second angle A2 is greater than the first angle A1.

Cap 22 comprises a cylindrical wall 42 extending from a planar end 44. The planar end 44 is perpendicular to wall 42 and has an opening 40 therein sized to receive a tool for rotating the filter 20. The wall 42 defines the interior portion or area sized to receive the cylindrical first end 26 of the filter body 24. In the exemplary embodiment, the cap 22 is movably coupled to the body 24 by circumferential groove 60 which limits axial movement of the cap 22 while allowing for rotation of the cap 22 relative to the body 24. At the edge of the interior surface of wall 42 is a protrusion 46, such as a lip, which is disposed within said circumferential groove 60. This protrusion 46 disposed around the inner circumference of the wall 42 may be solid around the circumference or alternately may comprise spaced apart slots to reduce the deflection of the cap as it is being pushed into place before the protrusion 46 aligns with the groove 60.

A plurality of projections 50, complementary to the plurality of flutes 30, is disposed about the circumference on an inner diameter of the wall 42. These projections 50 are disposed to engage the plurality of flutes 30 positioned around the outer periphery of first end 26 when a rotational force is applied to the exterior of the cap 22 in a first direction. Each projection 50 includes a third ramp surface 52 and an adjoining fourth ramp surface 54. Additionally, a curved transition surface or flute tip 56 connects top ends the third and fourth ramp surfaces 52 and 54, and another curved transition surface or flute fillet 58 connects bottom ends of the third and fourth ramp surfaces 52, 54. The third ramp surface 52 is disposed at a third angle A3 with respect to a straight line 41 formed between the flute fillets 58 formed by the third and fourth ramp surfaces, and the fourth ramp surface 54 is disposed at a fourth angle A4 with respect to the straight line 41, wherein the fourth angle A4 is greater than the third angle A3. The plurality of projections 50 may extend either partially or along the entire length of the cap wall 42. Additionally, the projections need not be positioned adjacent to the planar end 44 of the cap; rather they may be situated centrally along the height of the cap wall 42.

The dimensions of the projections 50 on the inner wall 42 of the cap 22 are similar to the dimensions of the flutes 30 on the filter body 24. When first end 26 of the body 24 is disposed within the interior area created by the wall 42 of the cap 22 and the complementary projections 50 and flutes 30 are arranged to engage, the third ramp surface 52 of each projection is adjacent the first ramp surface 32 of each flute, and the fourth ramp surface 54 of each projection is adjacent the second ramp surface 34 such that the projection tip 58 generally aligns with the flute fillet 36. Consequently, flute fillet 36 may have a greater arc radius than projection tip 58. Similarly, flute tip 38 is aligned with projection fillet 56 such that projection fillet 56 may have a larger arc radius than that of flute tip 38.

The cap 22 is designed such that the cap 22 rotates relative to filter body 24 when a maximum torque level is exceeded. When the cap is rotated in a first direction and the torque threshold is exceeded, the plurality of projections 50 rotates past the plurality of flutes 30. In the example of an oil filter for use in an automobile engine, the maximum torque level threshold is between 50 and 100 inch-pounds. Initial engagement between the cap 22 and filter body 24 causes the cap 22 and filter body 24 to act as a single body when a rotational force is applied to the exterior surface of the cap 22. This is due to the engagement between the first ramp surface 32 and the third ramp surface 52 as the cap is rotated in a first direction. As the second end 28 of the body 24 engages with the threads of the engine, the sealing gasket (not shown) compresses causing the torque of the filter body 24 and cap 22 to increase. As the torque increases, projection third ramp surfaces 52 slide with respect to flute first ramp surfaces 32 such that a gap is created between each projection fourth ramp surface 54 and each flute second ramp surface 34. This displacement of the projections 50 with respect to the flutes 30 creates an outward radial force acting on the cap 22 and an inward radial force acting on the flutes 30. Once the torque exceeds the maximum torque level that the cap 22 is designed to withstand, the projections 50 will rotate and align with the next consecutive flute 30 around the circumference of the body 24.

Additionally, the cap 22 may also assist a user in removal of the filter from an application. When the cap 22 is rotated in a second direction opposite the first direction, the shape of the flutes 30 and projections 50 causes the fourth ramp surfaces 54 of the projections to engage the second ramp surfaces 34 of the flutes 30. Because of the second and fourth angles, the fourth ramp surface 54 of the projections resist slippage with respect to the second ramp surfaces 34 of the flutes, thereby causing the cap 22 and body 24 to rotate together. In one example, the second angle may be approximately 90 degrees so that the rotational force in the second direction does not cause outward deflection of the cap 22 or inward deflection of the body 24.

In one exemplary embodiment, the exterior surface of the cap wall 42 may be smooth. In alternate embodiments, the exterior surface of wall 42 may comprise a surface roughness or additional features to make the cap 22 easier for a user to grip.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:
1. A fluid filter comprising:
a body having a first end and a second end, the body having a plurality of flutes disposed about a circumference of the body adjacent the first end; and,
a cap having a wall defining an interior area wherein the body is disposed within the interior area, the wall having a plurality of projections disposed about a circumference on an inner diameter of the wall, wherein the plurality of projections are arranged to engage the plurality of flutes;

wherein the plurality of projections remain stationary with respect to the plurality of flutes when a torque applied to the cap in a first direction is below a threshold and the plurality of projections rotates relative to the plurality of flutes when the torque applied to the cap in the first direction exceeds the threshold;

wherein a circumferential groove is disposed in an outer circumference of the body between the plurality of flutes and the second end and the cap is coupled to the circumferential groove to prevent axial movement of the cap off of the body, but allow the cap to rotate about the circumferential groove.

2. The fluid filter of claim 1 wherein the cap includes a protrusion disposed on an end of the wall, the protrusion being disposed within the circumferential groove.

3. The fluid filter of claim 1 wherein the cap includes a planar end having an opening therein, the opening being sized to receive a tool.

4. The fluid filter of claim 1 wherein each of the plurality of flutes includes a first ramp surface and an adjacent second ramp surface, wherein the first ramp surface is disposed at a first angle with respect to a straight line formed between and connecting adjacent flute fillets formed by the first and second ramp surfaces and the second ramp surface is disposed at a second angle with respect to the straight line formed between and connecting adjacent flute fillets formed by the first and second ramp surfaces, the second angle being greater than the first angle.

5. The fluid filter of claim 4 wherein the plurality of projections is arranged to engage the first ramp surfaces and the second ramp surfaces of the plurality of flutes.

6. A fluid filter comprising:
a cylindrical body having an end with a plurality of flutes, the plurality of flutes being about a circumference of the body adjacent the end; and,
a cap non-removably coupled to the body, the cap having a planar end and a cylindrical wall extending from the planar end, the cylindrical wall defining an interior portion sized to receive the cylindrical body, the wall having a plurality of projections disposed to engage the plurality of flutes, wherein the plurality of projections rotates relative to the plurality of flutes only when a torque applied to the cap in a first direction exceeds a threshold;
wherein a circumferential groove is disposed in an outer circumference of the body between the plurality of flutes and the second end and the cap is coupled to the circumferential groove to prevent axial movement of the cap off of the body, but allow the cap to rotate about the circumferential groove.

7. The fluid filter of claim 6 wherein the threshold is between 50 to 100 inch-pounds (5.65 to 11.3 Newton-meters).

8. The fluid filter of claim 6 wherein:
each of the plurality of flutes includes a first ramp surface and an adjacent second ramp surface, wherein the first ramp surface is disposed at a first angle with respect to a straight line formed between and connecting adjacent flute fillets formed by the first and second ramp surfaces and the second ramp surface is disposed at a second angle with respect to the straight line formed between and connecting adjacent flute fillets formed by the first and second ramp surfaces, the second angle being greater than the first angle;
each of the plurality of projections includes a third ramp surface and an adjacent fourth ramp surface, wherein the third ramp surface is disposed at a third angle with respect to a straight line formed between and connecting adjacent projection tips formed by the third and fourth ramp surfaces and the fourth ramp surface is disposed at a fourth angle with respect to the straight line formed between and connecting adjacent projection tips formed by the third and fourth ramp surfaces, the fourth angle being greater than the third angle; and,
rotation of the cap member in the first direction engages the first ramp surface and the third ramp surface.

9. The fluid filter of claim 8 wherein the body further includes a circumferential groove disposed adjacent the plurality of flutes.

10. The fluid filter of claim 9 wherein the wall further includes a protrusion arranged to engage the circumferential groove.

11. The fluid filter of claim 10 further comprising an opening in the planar end of the cap, the opening sized to receive a tool.

12. A fluid filter comprising:
a cylindrical body having a first end configured to be installed within an engine and a second end opposite the first end and including a plurality of flutes, the plurality of flutes being about a circumference of the body adjacent the second end, each of the plurality of flutes having a first ramp surface disposed at a first angle with respect to a straight line formed between adjacent flute fillets formed by the first and second ramp surfaces, a second ramp surface at a second angle with respect to the straight line formed between adjacent flute fillets formed by the first and second ramp surfaces; and,
a cap coupled for rotation to the body, the cap having a plurality of projections disposed to engage the plurality of flutes, wherein the plurality of projections rotates past the plurality of flutes only when a torque applied to the cap in first direction exceeds a threshold;
wherein a circumferential groove is disposed in an outer circumference of the body between the plurality of flutes and the second end and the cap is coupled to the circumferential groove to prevent axial movement of the cap off of the body, but allow the cap to rotate about the circumferential groove.

13. The fluid filter of claim 12 wherein each of the plurality of projections includes a third ramp surface disposed at a third angle with respect to a straight line formed between adjacent projection tips formed by the third and fourth ramp surfaces and a fourth ramp surface disposed at a fourth angle with respect to the straight line formed between adjacent projection tips formed by the third and fourth ramp surface, wherein the third ramp surface engages the first ramp surface when a torque is applied to the cap in the first direction.

14. The fluid filter of claim 13 wherein the fourth ramp surface engages the second ramp surface when a torque is applied to the cap in a second direction, the second direction being opposite the first direction.

15. The fluid filter of claim 14 wherein the cap member includes a cylindrical wall defining an interior portion sized to receive the body, the cylindrical wall having a protrusion on an end, the protrusion being disposed in the groove.

16. The fluid filter of claim 15 wherein the cap includes an opening on the planar end, the opening being sized to receive a tool.

17. The fluid filter of claim 12 wherein the threshold is between 50 to 100 inch-pounds.

* * * * *